United States Patent

Bethea, Jr.

[15] 3,684,222
[45] Aug. 15, 1972

[54] LOAD DETERMINATION HANGER FOR TRANSMISSION LINE TOWER

[72] Inventor: Malcolm Bethea, Jr., P.O. Box 1407, Birmingham, Ala. 35201

[22] Filed: May 11, 1971

[21] Appl. No.: 142,218

[52] U.S. Cl. .................................................248/64
[51] Int. Cl. .............................................F16l 3/18
[58] Field of Search.........248/64, 63, 317; 174/40 R, 174/45 R

[56] References Cited

UNITED STATES PATENTS

| 2,931,606 | 4/1960 | Fraser | 248/64 |
| 3,519,727 | 7/1970 | Rasmussen | 248/64 X |

FOREIGN PATENTS OR APPLICATIONS

| 70,069 | 2/1946 | Norway | 248/64 |

*Primary Examiner*—Chancellor E. Harris
*Attorney*—Jennings, Carter & Thompson

[57] ABSTRACT

Load determination hanger for transmission line tower having spaced apart depending supports with a recess in at least one depending support. Elongated pin extends between supports with one end thereof within recess. Horizontal supports carried by depending supports extend inwardly in spaced relation to each other beneath pin to limit downward movement thereof with pin being free to move over horizontal supports upon application of force of a magnitude to bend pin. Load carrying member connected to pin depends between horizontal supports.

7 Claims, 7 Drawing Figures

INVENTOR.
Malcolm Bethea, Jr.

INVENTOR.
Malcolm Bethea, Jr.
BY
Jennings Carter & Thompson
Attorneys

LOAD DETERMINATION HANGER FOR TRANSMISSION LINE TOWER

BACKGROUND OF THE INVENTION

This invention relates to a load determination hanger for transmission line towers and the like and more particularly to a protective hanger which releases a transmission line from the tower upon the application of excessive forces in a non-vertical direction whereby the tower is protected against bending or damage where excessive forces are applied to the transmission line in a non-vertical direction.

As is well known in the art to which my invention relates, transmission line towers are constructed whereby they will withstand excessive forces when applied in a vertical direction. On the other hand, such towers are not constructed to withstand excessive forces in a non-vertical direction, such as forces imparted to the tower in a direction parallel to the transmission line or generally horizontal forces imparted transversely of the transmission line. Accordingly, where excessive non-vertical forces are applied to a tower, the tower will bend or fall thus adding to the weight of the transmission line and bringing about excessive, non-vertical forces to the adjacent towers whereupon a series of transmission line towers fall as a result of excessive non-vertical forces being applied to a single tower.

BRIEF SUMMARY OF INVENTION

In accordance with my invention, I provide means for releasing the transmission line automatically from the tower immediately upon the application of excessive forces to the tower in a non-vertical direction, such as forces imparted in a direction longitudinally of the transmission line. By releasing the transmission line from its supporting tower immediately upon the application of excessive forces thereto in a non-vertical direction, the tower does not fall or bend whereby excessive forces are transmitted to adjacent towers. In accordance with my invention, I provide spaced apart depending supports having a recess within at least one depending support. An elongated pin extends between the supports with an end of the pin within the recess. Horizontal supports carried by the depending supports extend inwardly in spaced relation to each other beneath the pin to limit downward movement of the pin and yet permit free horizontal movement of pin over the horizontal supports upon the application of a force in a non-vertical direction of a magnitude to bend the pin. That is, the pin moves automatically to released position immediately upon the application of excessive non-vertical forces. The transmission line is carried by a load carrying member which depends between the horizontal supports.

Load determination hangers embodying features of my invention are illustrated in the accompanying drawing, forming a part of this application, in which.

Figure 4:
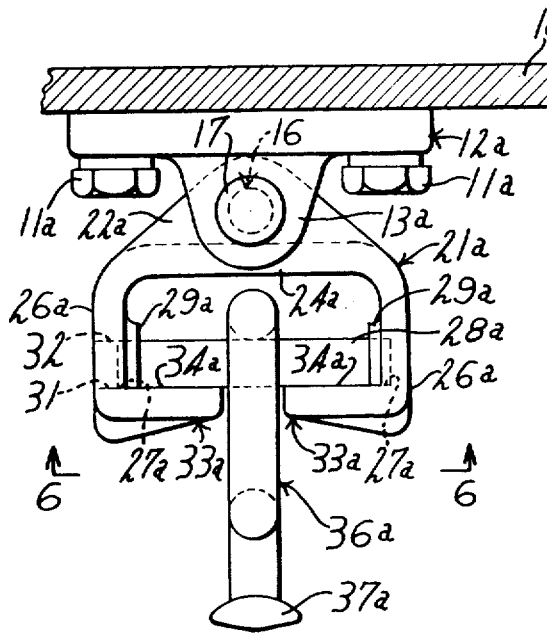
FIG. 4 is an end elevational view of a modified form of hanger looking in the direction that the transmission line extends, a part of the supporting tower being shown in section.
Figure 5:
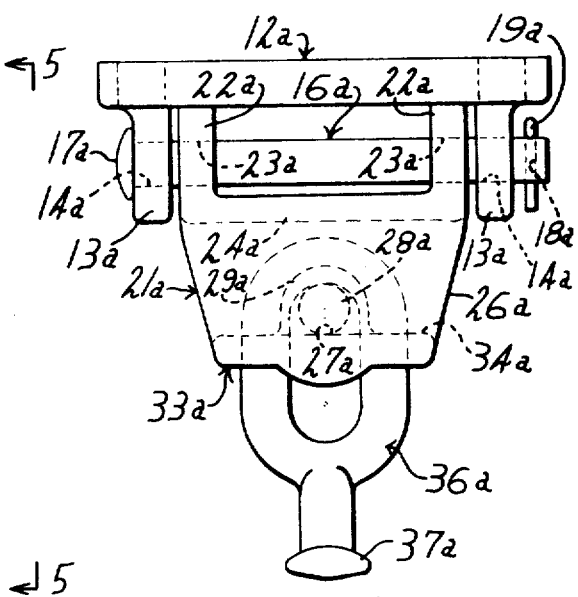
FIG. 5 is a side elevational view taken generally along the line 5—5 of FIG. 4, the fragment of the supporting tower and the means for securing the hanger to the tower being omitted.
Figure 6:
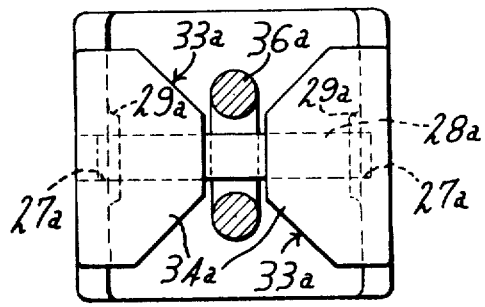
Figure 7:
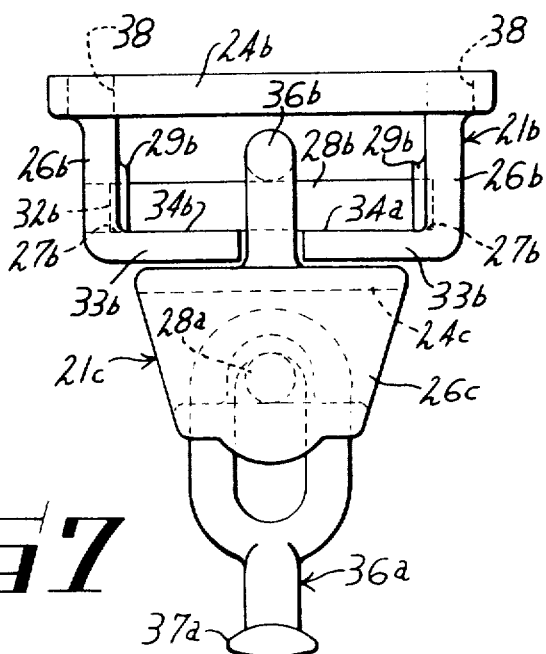

FIG. 6 is a bottom plan view taken generally along the line 6—6 of FIG. 4 and showing my improved hanger bracket removed from the remainder of the apparatus; and, FIG. 7 is a side elevational view corresponding to FIG. 5 showing my improved protector hanger applied to both pivot joints whereby the transmission line is released from the tower upon the application of excessive forces both in a direction longitudinally of the transmission line and transversely thereof.

Figure 1:
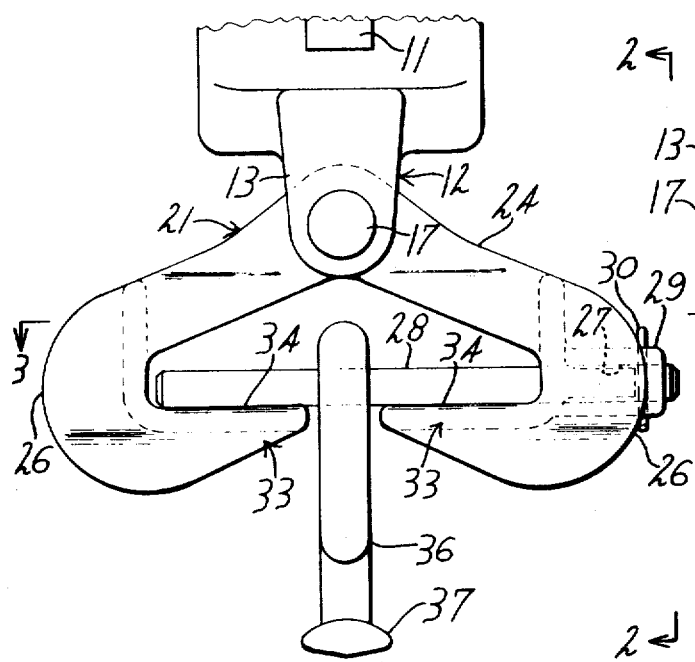
FIG. 1 is an end elevational view of the hanger looking in the direction that the transmission line extends, partly broken away.

Referring now to the drawing for a better understanding of my invention, I show in FIG. 1 a fragment 10 of a transmission line tower. Secured to the transmission tower by suitable bolts 11 is a support bracket 12 having depending ears 13. Suitable openings 14 are provided in the ears 13 for receiving an elongated pin 16 having a head 17 at one end thereof and a transverse opening 18 adjacent the other end thereof for receiving a cotter pin 19.

Figure 2:
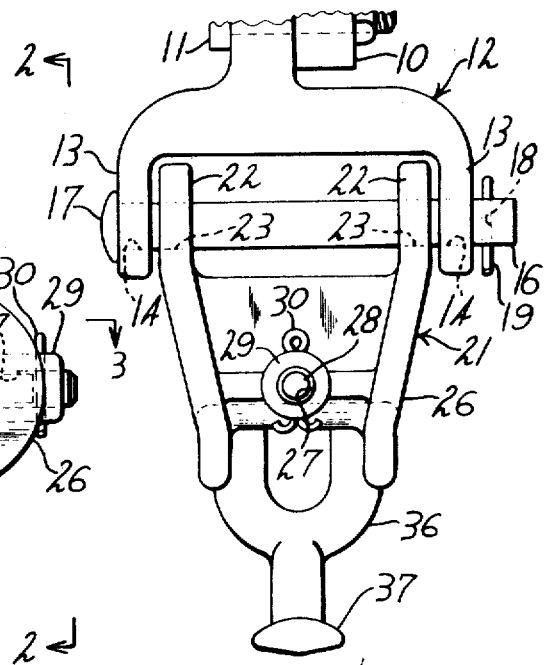
FIG. 2 is a side elevational view, partly broken away, taken generally along the line 2—2 of FIG. 1.

As shown in FIGS. 1 and 2, a hanger bracket 21 having upstanding ears 22 is pivotally connected to the elongated pin 16 between the depending ears 13 of the support bracket 12. Openings 23 are provided through the ears 22 for receiving the elongated pin 16 whereby the hanger bracket 21 is supported for pivotal movement from the elongated pin 16. As shown in FIG. 1, the hanger bracket 21 has a base portion 24 with depending side members 26 at opposite ends of the base member 24. A recess or passageway 27 is provided in one side member 26 in position to receive an end of an elongated pin 28, as shown in FIG. 1. Preferably, a reinforcing boss 29 surrounds the recess 27, as shown. Suitable openings are provided through the pin 28 and boss 29 for receiving a cotter pin 30 whereby the adjacent end of pin 28 is secured to the bracket 21.

Figure 3:
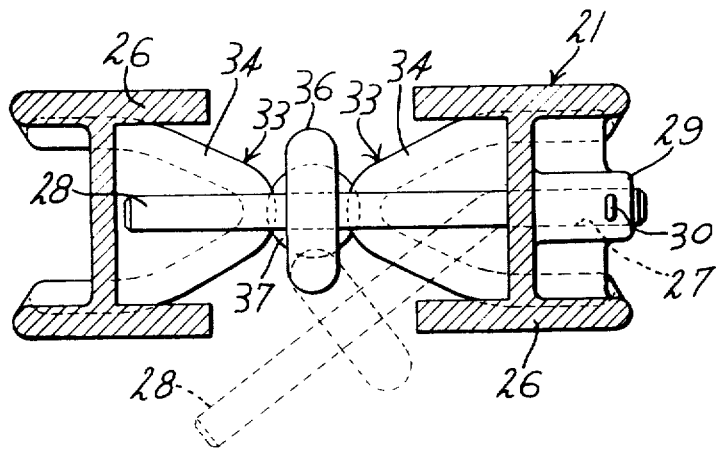
FIG. 3 is a sectional view taken generally along the line 3—3 of FIG. 1.

Formed integrally with the lower end of each depending side support member 26 is an inwardly extending support member 33 having an upper surface 34 which extends in a generally horizontal plane, as shown in FIGS. 1 and 2. The inner ends of the horizontal supports 33 terminate in spaced relation to each other, as shown in FIGS. 1 and 3 for receiving a depending load carrying member 36 which may be in the form of a conventional insulator fitting having an enlarged lower end 37 for engaging a socket in a conventional type insulator in a manner well understood in the art to which my invention relates. The upper portion of the load carrying member 36 is in the form of a loop which surrounds the elongated pin 28.

From the foregoing description, the operation of the hanger shown in FIGS. 1 to 3 will be readily understood. With the hanger bracket 21 operatively connected to the tower by the support bracket 12, the transmission line supported by the depending load carrying member 36 extends in a direction generally perpendicular to the elongated pin 28. Accordingly, the inwardly extending horizontal supports 33 engage the under surface of the elongated pin 28 whereby downward movement of the pin 28 is limited. On the other hand, the inwardly extending horizontal supports 33 do not interfere with movement of the pin 28 over the upper surface 34. Accordingly, when excessive forces are exerted by the transmission line in a direction generally parallel to the transmission line, the pin 28 is bent to the dotted line position shown in FIG. 3, whereby the free end of the elongated pin 28 is in position to release the load carrying member 36 thus separating the load carrying member 36 from the hanger bracket 21. It will thus be seen that each time excessive forces are applied in a direction longitudinally of the transmission line, the elongated pin 28 would be bent to separate the transmission line from its supporting tower.

Referring now to FIGS. 4, 5 and 6 of the drawings I show a modified form of my invention. A fragment of a transmission line tower is shown at 10a. Secured to the transmission tower by suitable bolts 11a is a support bracket 12a having depending ears 13a. Suitable openings 14a are provided in the ears 13a for receiving an elongated pin 16a having a head 17a at one end thereof and a transverse opening 18a adjacent the other end thereof for receiving a cotter pin 19a.

As shown in FIGS. 4 and 5, a hanger bracket 21a having upstanding ears 22a is pivotally connected to the elongated pin 16a between the depending ears 13a of the support bracket 12a. Openings 23a are provided through the ears 22a for receiving the elongated pin 16a whereby the hanger bracket 21a is supported for pivotal movement from the elongated pin 16a. As shown in FIG. 4, the hanger bracket 21a is of an inverted U-shaped having a base portion 24a with depending side members 26a at opposite ends of the base member 24a. Inwardly facing recesses 27a are provided in each side member 26a in position to receive opposite ends of an elongated pin 28a, as shown in FIG. 4. Preferably, a reinforcing boss 29a surrounds each of the recesses 27a, as shown. To facilitate insertion of the elongated pin 28a into the recesses 27a, a through opening 31 is provided in one depending side member 26a, as shown in FIG. 4 for receiving a stop member 32 which is inserted after installation of the pin 28a. That is, the stop member 32 limits longitudinal movement of the pin 28a after installation and prevents the pin from moving outwardly through opening 31.

Formed integrally with the lower end of each depending side support member 26a is an inwardly extending support member 33a having an upper surface 34a which extends in a generally horizontal plane, as shown in FIGS. 4 and 5. The inner ends of the horizontal supports 33a terminate in spaced relation to each other, as shown in FIGS. 4 and 6 for receiving a depending load carrying member 36a which may be in the form of a conventional insulator fitting having an enlarged lower end 37a for engaging a socket in a conventional type insulator in a manner well understood in the art to which my invention relates. The upper portion of the load carrying member 36a is in the form of a loop which surrounds the elongated pin 28a.

From the foregoing description, the operation of the hanger shown in FIGS. 4 to 6 will be readily understood. With the hanger bracket 21a operatively connected to the tower 10a by the support bracket 12a, the transmission line supported by the depending load carrying member 36a extends in a direction generally perpendicular to the elongated pin 28a. Accordingly, the inwardly extending horizontal supports 33a engage the under surface of the elongated pin 28a whereby downward movement of the pin 28a is limited. When excessive forces are exerted by the transmission line in a direction generally parallel to the transmission line, the pin 28a is bent at the point of contact with the load carrying member 36a whereby the ends of the elongated pin 28a are removed from the recesses 27a thus separating the pin 28a and its load carrying member 36a from the hanger bracket 21a. It will thus be seen that each time excessive forces are applied in a direction longitudinally of the transmission line, the elongated pin 28a would be bent thus withdrawing the ends thereof from the recesses 27a to separate the transmission line from its supporting tower. By thus separating the transmission line from its supporting tower, I not only eliminate bending or damage to the supporting tower but also prevent damage to a series of adjacent support towers. That is, when excessive forces are applied to a supporting tower and the transmission line is not immediately separated from the tower, the tower would bend or fall thus increasing the forces applied to the transmission line whereby excessive forces would be transmitted in series to transmission towers adjacent thereto. It will thus be seen that the failure or falling of one supporting tower would thus bring about the failure or falling of adjacent supporting towers.

In FIG. 7 of the drawing, I show my improved protective hanger mounted at both pivot joints of the hanger assembly whereby the transmission line would be separated from the tower upon the application of excessive forces in either a longitudinal or transverse direction. I show a hanger bracket 21b having suitable opening 38 therein for receiving retaining members whereby the hanger bracket 21b is connected to a supporting tower as described hereinabove. The hanger bracket 21a is generally of an inverted U-shape having a base portion 24b and depending side members 26b. Inwardly facing recesses 27b are provided in the side members 26b for receiving opposite ends of an elongated pin 28b. Reinforcing bosses 29b are preferably provided around the recesses 27b, as shown. A through opening 31b is provided through one depending side member 26b for inserting the elongated pin 28b during assembly. A stop member 32b closes the through opening 31b after the elongated pin 28b is inserted. Inturned horizontal support members 33b are formed integrally with the lower ends of the side members 26b with the inner ends of the support members 33b being spaced from each other to receive a loop-like load carrying member 36b. The upper surface 34b of each horizontal support member 33b extends in a generally horizontal direction, as shown, whereby the horizontal support members 33b limit downward movement of the elongated pin 28b and do not interfere with horizontal movement thereof.

Secured to the lower end of the load carrying member 36b is a hanger bracket 21c which is substantially identical to the hanger bracket 21a, the only difference being the manner in which the hanger bracket 21c is supported. That is, the hanger bracket 21c is of an inverted U-shape having a base portion 24c and depending side members 26c. The upper surface of the base member 24c is supported by a single upstanding ear which defines the load carrying member 36b rather than being supported by a pair of upstanding ears, such as ears 22a of hanger bracket 21a. In all other respects, the hanger bracket 21c is identical to hanger bracket 21a, whereby it is adapted to support a depending load carrying member 36a.

The operation of the hanger bracket 21c is identical to the operation of hanger bracket 21a. That is, upon the application of excessive forces in a direction longitudinally of the transmission line, the elongated pin 28a connected to the load carrying member 36a would bend whereby its ends would leave its associated recesses to thus separate the transmission line from the hanger bracket 21c in the identical manner that the transmission line is separated from hanger bracket 21a.

Upon the application of excessive forces in a direction transversely of the transmission line, the elongated pin 28b would ride over the upper surface 34b of the inwardly extending horizontal supports 33b whereby the ends of pin 28b would be separated from their associated recesses 27b. Accordingly, the load carrying member 36b and pin 28b would be separated from the hanger bracket 21b.

From the foregoing, it will be seen that I have devised an improved load determination hanger for transmission line towers. By providing a hanger which automatically separates the transmission line from its supporting tower immediately upon the application of excessive forces in non-vertical directions, I eliminate damage to supporting towers and at the same time prevent the failure of one tower from causing damage to adjacent towers. Also, by providing a load determination hanger wherein the only elements damaged during separation of the transmission line from the tower is the elongated pin which is bent, the line may be placed back in service by merely replacing the bent pin.

Furthermore, by providing inturned horizontal supports which limit downward movement of the elongated support pin, the pin cannot be bent except where excessive forces are applied in a non-vertical direction.

While I have shown my invention in several forms, it will be obvious to those skilled in the art that it is not so limited, but is susceptible of various other changes and modifications without departing from the spirit thereof.

What I claim is:

1. In a load determination hanger for a transmission line tower:
   a. a hanger bracket adapted to be operatively connected to a tower and having spaced apart depending supports,
   b. there being a recess in at least one of said depending supports,
   c. an elongated pin extending between said depending supports with an end thereof within said recess,
   d. a depending load carrying member connected to said pin and extending downwardly between said depending supports, and
   e. horizontal supports carried by said depending supports extending inwardly toward and in spaced relation to each other beneath said pin limiting downward movement of said pin and permitting movement of said pin over said horizontal supports upon application of a force to said pin of a magnitude to bend said pin whereby said load carrying member is released.

2. A load determination hanger for a transmission line tower as defined in claim 1 in which one end of said elongated pin is secured to one of said depending supports with the other end of said pin extending freely over said horizontal supports.

3. A load determination hanger for a transmission line tower as defined in claim 1 in which inwardly facing recesses are provided in each of said depending supports receiving opposite ends of said elongated pin with the ends of said pin being disposed to move out of said recesses upon bending said pin.

4. A load determination hanger for a transmission line tower as defined in claim 1 in which the hanger bracket comprises:
   a. an inverted U-shaped member having depending legs, and
   b. means to operatively connect the base of said U-shaped member to a tower.

5. A load determination hanger for a transmission line tower as defined in claim 4 in which the base of said U-shaped member carries at least one upstanding eye member for receiving a supporting pin.

6. A load determination hanger for a transmission line tower as defined in claim 1 in which said horizontal supports are relatively flat and engage the under surface of said elongated pin.

7. A load determination hanger for a transmission line tower as defined in claim 1 in which at least one of said depending supports is provided with an opening therethrough for receiving said elongated pin and said pin is retained within said opening after installation by a stop member inserted in the outer end of said opening.

* * * * *